US012695720B2

(12) United States Patent
Zhuo et al.

(10) Patent No.: US 12,695,720 B2
(45) Date of Patent: Jul. 28, 2026

(54) METHOD AND APPARATUS FOR IP ADDRESS MANGEMENT IN AN IAB NETWORK

(71) Applicant: LENOVO (BEIJING) LIMITED, Beijing (CN)

(72) Inventors: Yibin Zhuo, Shanghai (CN); Mingzeng Dai, Shanghai (CN); Lianhai Wu, Beijing (CN); Le Yan, Shanghai (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 18/858,612

(22) PCT Filed: Apr. 22, 2022

(86) PCT No.: PCT/CN2022/088391
§ 371 (c)(1),
(2) Date: Oct. 21, 2024

(87) PCT Pub. No.: WO2023/201683
PCT Pub. Date: Oct. 26, 2023

(65) Prior Publication Data
US 2025/0286858 A1 Sep. 11, 2025

(51) Int. Cl.
*H04L 61/5007* (2022.01)
*H04W 36/08* (2009.01)

(52) U.S. Cl.
CPC ......... *H04L 61/5007* (2022.05); *H04W 36/08* (2013.01)

(58) Field of Classification Search
CPC ........... H04L 61/5007; H04L 61/5084; H04W 36/08; H04W 88/085
See application file for complete search history.

(56) References Cited

U.S. PATENT DOCUMENTS 12,520,131 B2 * 1/2026 Xu .......................... H04W 8/26
2022/0117007 A1 4/2022 Akl et al.
(Continued)

FOREIGN PATENT DOCUMENTS

CN 113940112 A 1/2022
WO 2021033036 A1 2/2021
(Continued)

OTHER PUBLICATIONS

Samsung, "Further discussion on IP address issues of IAB network", 3GPP TSG-RAN WG3 Meeting #105bis R3-194994, Oct. 14-18, 2019, pp. 1-4.

(Continued)

*Primary Examiner* — Frantz B Jean
(74) *Attorney, Agent, or Firm* — Kunzler Needham & Hilton

(57) ABSTRACT

Embodiments of the present disclosure relate to IP address management in an IAB network. According to some embodiments of the disclosure, a wireless network node may: receive an IP address configuration indicating an IP address of a second DU, wherein the wireless network node comprises a first DU associated with a first BS and the second DU associated with a second BS, and the wireless network node migrates from the first BS to the second BS, and wherein the IP address configuration is received from one of the first BS and the second BS or an OAM according to an IP address allocation scheme; and initiate an F1 interface setup with the second BS using the IP address of the second DU.

20 Claims, 8 Drawing Sheets

(56) References Cited

U.S. PATENT DOCUMENTS

| | | | | | |
|---|---|---|---|---|---|
| 2022/0286841 | A1* | 9/2022 | Mildh | .................... | H04W 8/26 |
| 2023/0292204 | A1* | 9/2023 | Mildh | .................. | H04W 36/18 |
| 2023/0328604 | A1* | 10/2023 | Teyeb | .............. | H04W 36/0235 |
| | | | | | 370/331 |
| 2024/0187953 | A1* | 6/2024 | Barac | ................... | H04W 40/36 |
| 2024/0314546 | A1* | 9/2024 | Xu | .......................... | H04W 8/26 |
| 2024/0334248 | A1* | 10/2024 | Barac | .................. | H04W 40/02 |

FOREIGN PATENT DOCUMENTS

| | | | |
|---|---|---|---|
| WO | 2022025818 | A1 | 2/2022 |
| WO | 2022067818 | A1 | 4/2022 |

OTHER PUBLICATIONS

ZTE, "Discussion on IAB inter-donor topology adaptation procedures", 3GPP TSG-RAN WG3 #114-e R3-214924, Nov. 1-11, 2021, pp. 1-14.

CATT, "Discussion on inter-CU migration for IAB", 3GPP TSG-RAN3 #114-e R3-215013, Nov. 1-11, 2021, pp. 1-4.

PCT/CN2022/088391, "Notification of Transmittal of the International Search Report and the Written Opinion of the International Searching Authority, or the Declaration", International Searching Authority, Dec. 16, 2022, pp. 1-6.

Qualcomm Inc., "CB: # 1302_IAB_Inter_Donor_Mig", 3GPP TSG-RAN WG3 Meeting #114-e R3-215900, Nov. 1-11, 2021, pp. 1-40.

Qualcomm Inc., "CB: # 1302_IAB_Inter_Donor_Mig", 3GPP TSG-RAN WG3 Meeting #114-e R3-216078, Nov. 1-11, 2021, pp. 1-41.

3GPP "3rd Generation Partnership Project; Technical Specification Group Radio Access Network; NR; NR and NG-RAN Overall Description; Stage 2 (Release 16)", 3GPP TS 38.300 V16.8.0, Dec. 2021, pp. 1-152.

3GPP, "3rd Generation Partnership Project; Technical Specification Group Radio Access Network; NR; Radio Resource Control (RRC) protocol specification (Release 16)", 3GPP TS 38.331 V16.7.0, Dec. 2021, pp. 1-963.

3GPP, "3rd Generation Partnership Project; Technical Specification Group Radio Access Network; NG-RAN; Architecture description (Release 16)", 3GPP TS 38.401 V16.8.0, Dec. 2021, pp. 1-79.

* cited by examiner

600

700

800 ⌐

900 ⌐

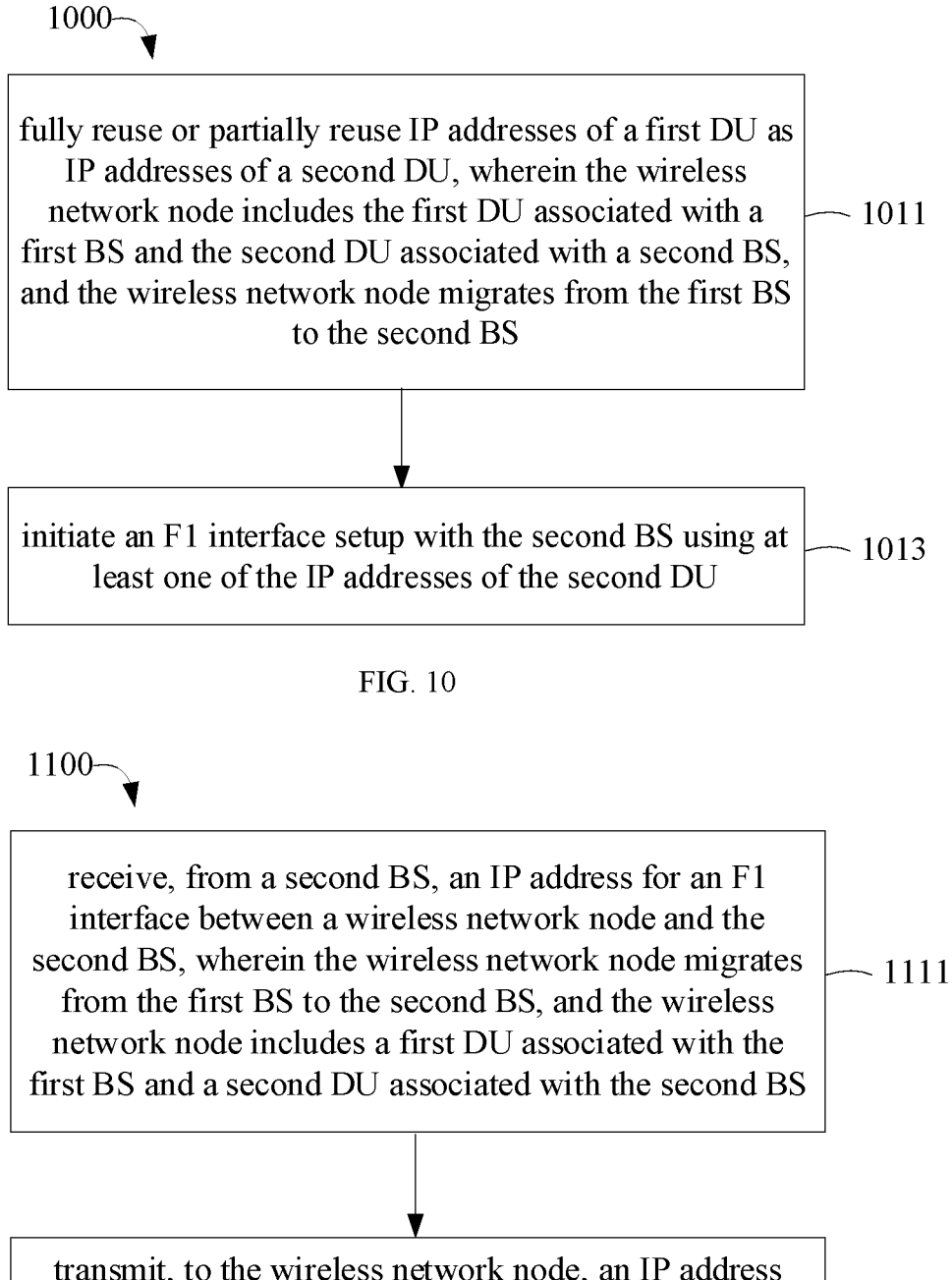

1000 fully reuse or partially reuse IP addresses of a first DU as IP addresses of a second DU, wherein the wireless network node includes the first DU associated with a first BS and the second DU associated with a second BS, and the wireless network node migrates from the first BS to the second BS ~ 1011 initiate an F1 interface setup with the second BS using at least one of the IP addresses of the second DU ~ 1013

FIG. 10

1100 receive, from a second BS, an IP address for an F1 interface between a wireless network node and the second BS, wherein the wireless network node migrates from the first BS to the second BS, and the wireless network node includes a first DU associated with the first BS and a second DU associated with the second BS ~ 1111 transmit, to the wireless network node, an IP address configuration indicating the IP address for the F1 interface ~ 1113 perform a procedure to migrate an MT of the wireless network node from the first BS to the second BS ~ 1115

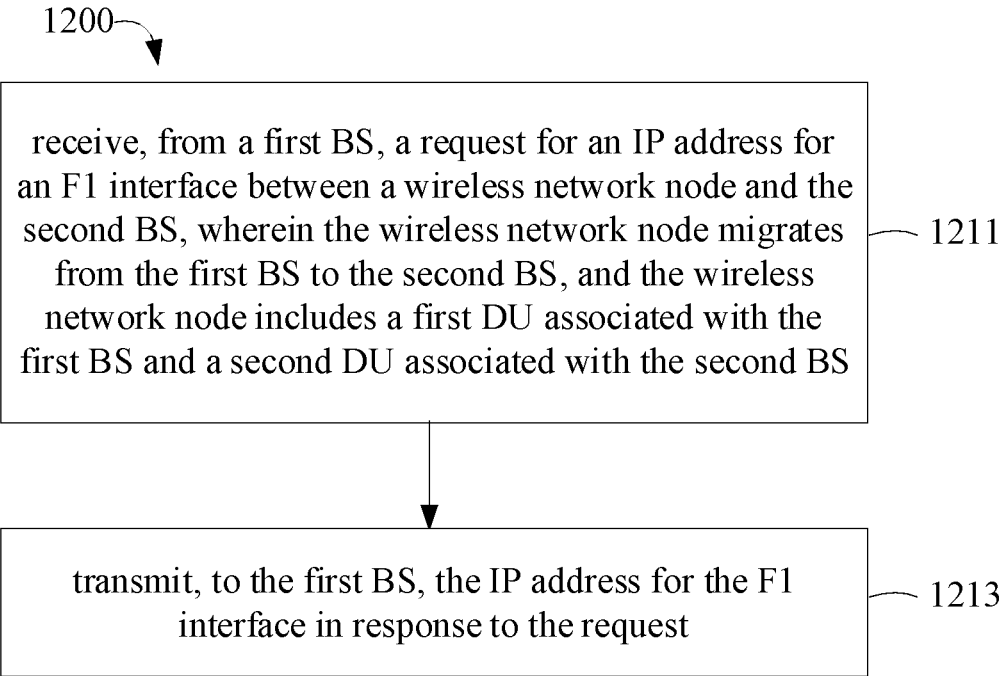

receive, from a first BS, a request for an IP address for an F1 interface between a wireless network node and the second BS, wherein the wireless network node migrates from the first BS to the second BS, and the wireless network node includes a first DU associated with the first BS and a second DU associated with the second BS — 1211 transmit, to the first BS, the IP address for the F1 interface in response to the request — 1213

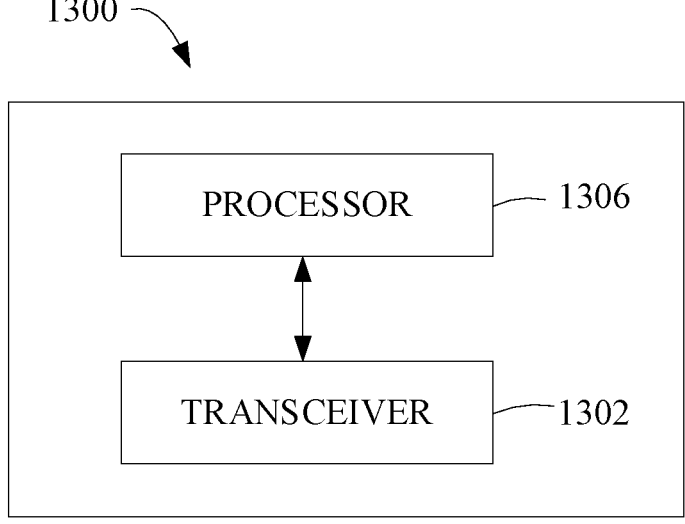

PROCESSOR — 1306

TRANSCEIVER — 1302

FIG. 13

METHOD AND APPARATUS FOR IP ADDRESS MANGEMENT IN AN IAB NETWORK

TECHNICAL FIELD

Embodiments of the present disclosure generally relate to communication technology, and more particularly to internet protocol (IP) address management in an integrated access and backhaul (IAB) network.

BACKGROUND

Wireless communication systems are widely deployed to provide various telecommunication services, such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems, such as long term evolution (LTE) systems, LTE-advanced (LTE-A) systems, or LTE-A Pro systems, and fifth generation (5G) systems which may also be referred to as new radio (NR) systems.

To extend the coverage and availability of wireless communication systems (e.g., 5G systems), the 3rd generation partnership project (3GPP) is envisioning integrated access and backhaul (IAB) architecture for supporting multi-hop relays. In an IAB network, an IAB node may hop through one or more IAB nodes before reaching a base station (also referred to as "an IAB donor" or "a donor node"). A single hop may be considered a special instance of multiple hops. Multi-hop backhauling is beneficial because it provides a relatively greater coverage extension compared to single-hop backhauling. In a relatively high frequency radio communication system (e.g., radio signals transmitted in frequency bands over 6 GHz), relatively narrow or less signal coverage may benefit from multi-hop backhauling techniques.

The industry desires technologies for handling IP address management in the IAB network.

SUMMARY

Some embodiments of the present disclosure provide a wireless network node. The wireless network node may include: a transceiver configured to receive an internet protocol (IP) address configuration indicating an IP address of a second distributed unit (DU), wherein the wireless network node comprises a first DU associated with a first base station (BS) and the second DU associated with a second BS, and the wireless network node migrates from the first BS to the second BS, and wherein the IP address configuration is received from one of the first BS and the second BS or an operation administration and maintenance (OAM) according to an IP address allocation scheme; and a processor coupled to the transceiver, wherein the processor is configured to initiate an F1 interface setup with the second BS using the IP address of the second DU.

Some embodiments of the present disclosure provide a wireless network node. The wireless network node may include: a transceiver; and a processor coupled to the transceiver, wherein the processor is configured to: fully reuse or partially reuse internet protocol (IP) addresses of a first distributed unit (DU) as IP addresses of a second DU, wherein the wireless network node comprises the first DU associated with a first base station (BS) and the second DU associated with a second BS, and the wireless network node migrates from the first BS to the second BS, and initiate an F1 interface setup with the second BS using at least one of the IP addresses of the second DU.

In some embodiments of the present disclosure, the IP addresses of the first DU may be received from one of the first BS and the second BS or an operation administration and maintenance (OAM) according to an IP address allocation scheme.

Some embodiments of the present disclosure provide a first base station (BS). The first BS may include: a transceiver configured to: receive, from a second BS, an internet protocol (IP) address for an F1 interface between a wireless network node and the second BS, wherein the wireless network node migrates from the first BS to the second BS, and the wireless network node comprises a first distributed unit (DU) associated with the first BS and a second DU associated with the second BS; and transmit, to the wireless network node, an IP address configuration indicating the IP address for the F1 interface; and a processor coupled to the transceiver, wherein the processor is configured to: perform a procedure to migrate a mobile termination (MT) of the wireless network node from the first BS to the second BS.

In some embodiments of the present disclosure, the transceiver may be further configured to transmit, to the second BS, a request for the IP address for the F1 interface between the wireless network node and the second BS.

Some embodiments of the present disclosure provide a second base station (BS). The second BS may include: a processor; a transceiver coupled to the processor, wherein the transceiver is configured to: receive, from a first BS, a request for an internet protocol (IP) address for an F1 interface between a wireless network node and the second BS, wherein the wireless network node migrates from the first BS to the second BS, and the wireless network node comprises a first distributed unit (DU) associated with the first BS and a second DU associated with the second BS; and transmit, to the first BS, the IP address for the F1 interface in response to the request.

In some embodiments of the present disclosure, in the case that the F1 interface setup between the wireless network node and the second BS precedes the migration of the MT of the wireless network node, the IP address for the F1 interface may include an IP address of the second DU of the wireless network node.

In some embodiments of the present disclosure, the transceiver may be further configured to transmit, to the first BS, an IP address of the second BS for the F1 interface between the wireless network node and the second BS.

In some embodiments of the present disclosure, the transceiver may be further configured to receive, from the wireless network node or the first BS, an indication indicating a removal of the F1 interface between the wireless network node and the first BS in response to a full migration of the wireless network node from the first BS to the second BS.

In some embodiments of the present disclosure, the processor may be configured to perform one of the following in response to receiving the indication: release an IP address of the first DU of the wireless network node in the case that the IP address of the first DU is allocated by the second BS; skip the release of the IP address of the first DU of the wireless network node in the case that an IP address of the second DU of the wireless network node fully or partially reuses the IP address of the first DU of the wireless network node; and release the IP address of the first DU of the wireless network node that is not reused by the second DU of the wireless network node.

Some embodiments of the present disclosure provide a method performed by a wireless network node. The method may include: receiving an internet protocol (IP) address configuration indicating an IP address of a second distributed unit (DU), wherein the wireless network node comprises a first DU associated with a first base station (BS) and the second DU associated with a second BS, and the wireless network node migrates from the first BS to the second BS, and wherein the IP address configuration is received from one of the first BS and the second BS or an operation administration and maintenance (OAM) according to an IP address allocation scheme; and initiating an F1 interface setup with the second BS using the IP address of the second DU.

Some embodiments of the present disclosure provide a method performed by a wireless network node. The method may include: fully reusing or partially reusing internet protocol (IP) addresses of a first distributed unit (DU) as IP addresses of a second DU, wherein the wireless network node comprises the first DU associated with a first base station (BS) and the second DU associated with a second BS, and the wireless network node migrates from the first BS to the second BS; and initiating an F1 interface setup with the second BS using at least one of the IP addresses of the second DU.

Some embodiments of the present disclosure provide a method performed by a first base station (BS). The method may include: receiving, from a second BS, an internet protocol (IP) address for an F1 interface between a wireless network node and the second BS, wherein the wireless network node migrates from the first BS to the second BS, and the wireless network node comprises a first distributed unit (DU) associated with the first BS and a second DU associated with the second BS; transmitting, to the wireless network node, an IP address configuration indicating the IP address for the F1 interface; and performing a procedure to migrate a mobile termination (MT) of the wireless network node from the first BS to the second BS.

Some embodiments of the present disclosure provide a method performed by a second base station (BS). The method may include: receiving, from a first BS, a request for an internet protocol (IP) address for an F1 interface between a wireless network node and the second BS, wherein the wireless network node migrates from the first BS to the second BS, and the wireless network node comprises a first distributed unit (DU) associated with the first BS and a second DU associated with the second BS; and transmitting, to the first BS, the IP address for the F1 interface in response to the request.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

Embodiments of the present disclosure provide technical solutions to facilitate and improve the implementation of various communication technologies, such as 5G NR.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

FIGS. 4-12 illustrate a flow chart of an exemplary procedure of wireless communications in accordance with some embodiments of the present disclosure; and FIG. 13 illustrates a block diagram of an exemplary apparatus in accordance with some embodiments of the present disclosure.

DETAILED DESCRIPTION

Figure 1:
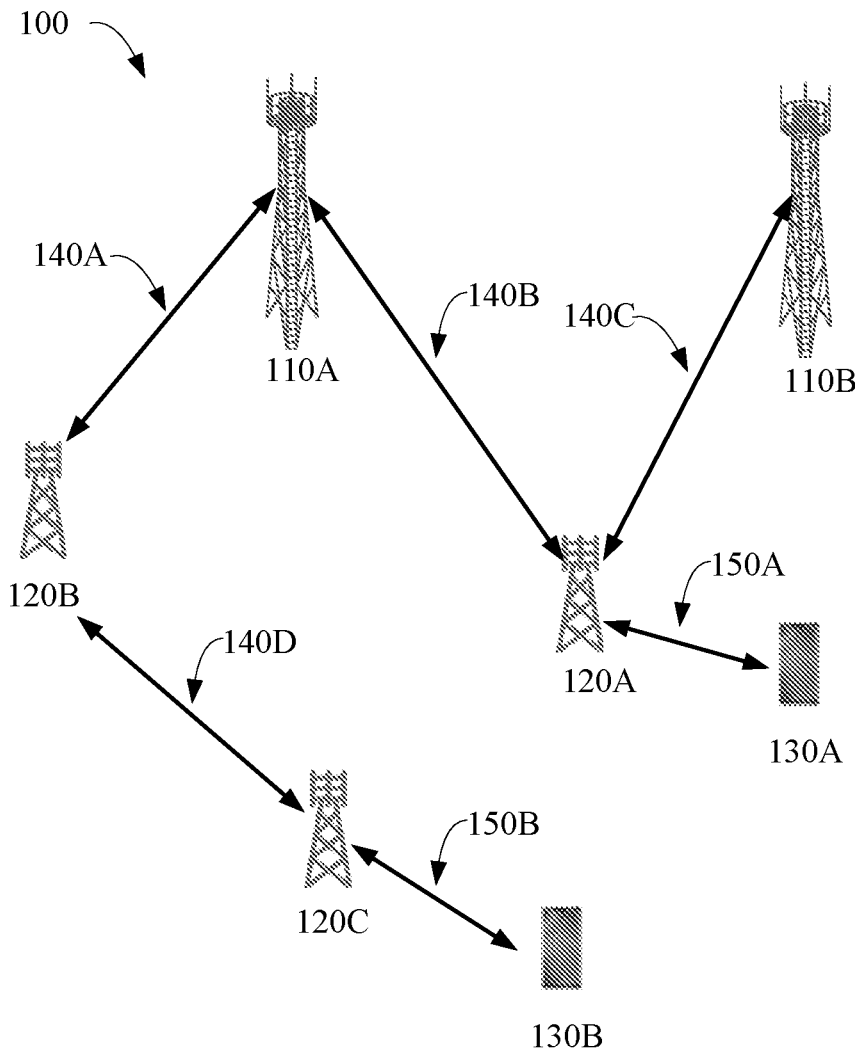
FIG. 1 illustrates a schematic diagram of a wireless communication system in accordance with some embodiments of the present disclosure.

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architectures and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Compared with the 4G communication system, the 5G communication system has raised more stringent requirements for various network performance indicators, for example, a 1000-time capacity increase, wider coverage requirements, ultra-high reliability, ultra-low latency, etc. Considering the rich frequency resources of high-frequency carriers, the use of high-frequency small station deployments is becoming more and more popular in hotspot areas in order to meet the needs of 5G ultra-high capacity. However, high-frequency carriers have poor propagation characteristics, severe attenuation due to obstructions, and limited coverage. Therefore, the dense deployment of small stations is required. In addition, the deployment of optical fiber may be difficult and costly for these small stations. Therefore, an economical and convenient backhaul scheme is needed. Integrated access and backhaul (IAB) technology, whose access link(s) and backhaul link(s) may both use wireless transmission solutions to avoid fiber deployment, provides ideas for solving the above problems.

In an IAB network, a wireless network node such as a relay node (RN) or an IAB node or a wireless backhaul node/device can provide wireless access services for UEs. That is, a UE can connect to an IAB donor relayed by one or more IAB nodes. The IAB donor may also be called a donor node or a donor base station (e.g., DgNB, Donor gNodeB). In addition, the wireless link between an IAB donor and an IAB node, or the wireless link between different IAB nodes can be referred to as a "backhaul link."

An IAB node may include an IAB mobile terminal (MT) part and an IAB distributed unit (DU) part. When an IAB node connects to its parent node (which may be another IAB node or an IAB donor), it can be regarded as a UE, i.e., the role of an MT. When an IAB node provides service to its child node (which may be another IAB node or a UE), it can be regarded as a network device, i.e., the role of a DU.

An IAB donor can be an access network element with a complete base station function, or an access network element with a separate form of a centralized unit (CU) and a distributed unit (DU). The IAB donor may be connected to the core network (for example, connected to the 5G core network (5GC)), and provide the wireless backhaul function for the IAB nodes. The CU of an IAB donor may be referred to as an "IAB donor-CU" (or directly referred to as a "CU"), and the DU of the IAB donor may be referred to as an "IAB donor-DU." The IAB donor-CU may be separated into a control plane (CP) and a user plane (UP). For example, a CU may include one CU-CP and one or more CU-UPs.

Considering the limited coverage of a high frequency band, and in order to ensure coverage performance of the network, multi-hop networking may be adopted in an IAB network. Taking into account the requirements of service transmission reliability, IAB nodes can support dual connectivity (DC) or multi-connectivity to improve the transmission reliability, so as to deal with abnormal situations that may occur on the backhaul (BH) link, such as radio link failure (RLF) or blockage, load fluctuations, etc.

In the case where an IAB network supports multi-hop and dual-connection networking, there may be multiple transmission paths between the UE and the IAB donor. A transmission path may include multiple nodes, such as a UE, one or more IAB nodes, and an IAB donor (if the IAB donor is in the form of a separate CU and DU, it may also contain an IAB donor-DU and an IAB donor-CU). Each IAB node may treat the neighboring node that provides backhaul services for it as a parent node (or parent IAB node), and each IAB node can be regarded as a child node (or child IAB node) of its parent node.

FIG. 1 illustrates a schematic diagram of wireless communication system 100 in accordance with some embodiments of the present disclosure.

As shown in FIG. 1, the wireless communication system 100 may include some base stations (e.g., IAB donor 110A and IAB donor 110B), some IAB nodes (e.g., IAB node 120A, IAB node 120B, and IAB node 120C), and some UEs (e.g., UE 130A and UE 130B). Although a specific number of UEs, IAB nodes, and IAB donors are depicted in FIG. 1, it is contemplated that any number of UEs, IAB nodes, and IAB donors may be included in the wireless communication system 100.

Each of IAB donor 110A, IAB donor 110B, IAB node 120A, IAB node 120B, and IAB node 120C may be directly connected to one or more IAB node(s) in accordance with some other embodiments of the present disclosure. Each of IAB donor 110A, IAB donor 110B, IAB node 120A, IAB node 120B, and IAB node 120C may be directly connected to one or more UEs in accordance with some other embodiments of the present disclosure.

UE 130A and UE 130B may be any type of device configured to operate and/or communicate in a wireless environment. For example, UE 130A and UE 130B may include a computing device, such as a desktop computer, a laptop computer, a personal digital assistant (PDA), a tablet computer, a smart television (e.g., television connected to the Internet), a set-top box, a game console, a security system (including a security camera), a vehicle on-board computer, a network device (e.g., router, switch, and modem), or the like. According to some embodiments of the present disclosure, UE 130A and UE 130B may include a portable wireless communication device, a smart phone, a cellular telephone, a flip phone, a device having a subscriber identity module, a personal computer, a selective call receiver, or any other device that is capable of transmission and receiving communication signals on a wireless network. In some embodiments of the present disclosure, UE 130A and UE 130B may include wearable devices, such as smart watches, fitness bands, optical head-mounted displays, internet-of-things (IoT) devices, or the like. Moreover, UE 130A and UE 130B may be referred to as a subscriber unit, a mobile, a mobile station, a user, a terminal, a mobile terminal, a wireless terminal, a fixed terminal, a subscriber station, a user terminal, or a device, or described using other terminology used in the art.

IAB donors 110A and 110B may be in communication with a core network (not shown in FIG. 1). The core network (CN) may include a plurality of core network components, such as a mobility management entity (MME) (not shown in FIG. 1) or an access and mobility management function (AMF) (not shown in FIG. 1). The CNs may serve as gateways for the UEs to access a public switched telephone network (PSTN) and/or other networks (not shown in FIG. 1).

Wireless communication system 100 may be compatible with any type of network that is capable of transmitting and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with 5G NR of the 3GPP protocol. For example, IAB donors 110A and 110B may transmit data using an orthogonal frequency division multiple (OFDM) modulation scheme on the DL. UE 130A and UE 130B may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

Persons skilled in the art should understand that as technology develops and advances, the terminologies described in the present disclosure may change, but should not affect or limit the principles and spirit of the present disclosure.

Referring to FIG. 1, IAB node 120A can be directly connected to IAB donors 110A and 110B, and IAB node 120B can be directly connected to IAB donor 110A. IAB donors 110A and 110B are parent nodes of IAB node 120A, and IAB donor 110A is a parent node of IAB node 120B. In other words, IAB nodes 120A and 120B are child IAB nodes of IAB donor 110A, and IAB node 120A is also a child IAB node of IAB donor 110B. IAB node 120C can reach IAB donor 110A by hopping through IAB node 120B. IAB node 120B is a parent IAB node of IAB node 120C. In other words, IAB node 120C is a child IAB node of IAB node 120B.

In some other embodiments of the present disclosure, an IAB node may be connected to IAB node 120C so it can reach IAB donor 110A by hopping through IAB node 120C and IAB node 120B. This IAB node and IAB node 120C may be referred to as the descendant IAB nodes of IAB node 120B.

UEs 130A and 130B can be connected to IAB nodes 120A and 120C, respectively. Uplink (UL) packets (e.g., data or signaling) from UE 130A or UE 130B can be transmitted to an IAB donor (e.g., IAB donor 110A or 110B) via one or more IAB nodes, and then transmitted by the IAB donor to a mobile gateway device (such as the user plane function (UPF) in the 5GC). Downlink (DL) packets (e.g., data or signaling) can be transmitted from the IAB donor (e.g., IAB donor 110A or 110B) after being received by the gateway device, and then transmitted to UE 130A or 130B through one or more IAB nodes.

For example, referring to FIG. 1, UE 130A may transmit UL data to IAB donor 110A or 110B or receive DL data therefrom via IAB node 120A. UE 130B may transmit UL data to IAB donor 110A or receive DL data therefrom via IAB node 120C and IAB node 120B.

In an IAB deployment such as the wireless communication system 100, the radio link between an IAB donor (e.g., IAB donor 110A or 110B in FIG. 1) and an IAB node or between two IAB nodes may be referred to as a backhaul link (BL). The radio link between an IAB donor (e.g., IAB donor 110A or 110B in FIG. 1) and a UE or between an IAB node and a UE may be referred to as an access link (AL). For example, in FIG. 1, radio links 140A to 140D are BLs and radio links 150A and 150B are ALs.

A protocol layer, the backhaul adaptation protocol (BAP) layer, located above the radio link control (RLC) layer, is introduced in an IAB system and can be used to realize packet routing, bearer mapping and flow control on the wireless backhaul link.

An F1 interface may be established between an IAB node (e.g., DU part of the IAB node) and an IAB donor (e.g., IAB donor-CU). The F1 interface may support both a user plane protocol (e.g., F1-U) and a control plane protocol (e.g., F1-C). The user plane protocol of the F1 interface may include one or more of a general packet radio service (GPRS) tunneling protocol user plane (GTP-U), user datagram protocol (UDP), internet protocol (IP) and other protocols. The control plane protocol of the F1 interface may include one or more of an F1 application protocol (F1AP), stream control transport protocol (SCTP), IP, and other protocols.

Through the control plane of the F1 interface, an IAB node and an IAB donor can perform, for example, interface management, IAB-DU management, and a UE context-related configuration. Through the user plane of the F1 interface, an IAB node and an IAB donor can perform, for example, user plane data transmission and downlink transmission status feedback functions.

Figure 2:
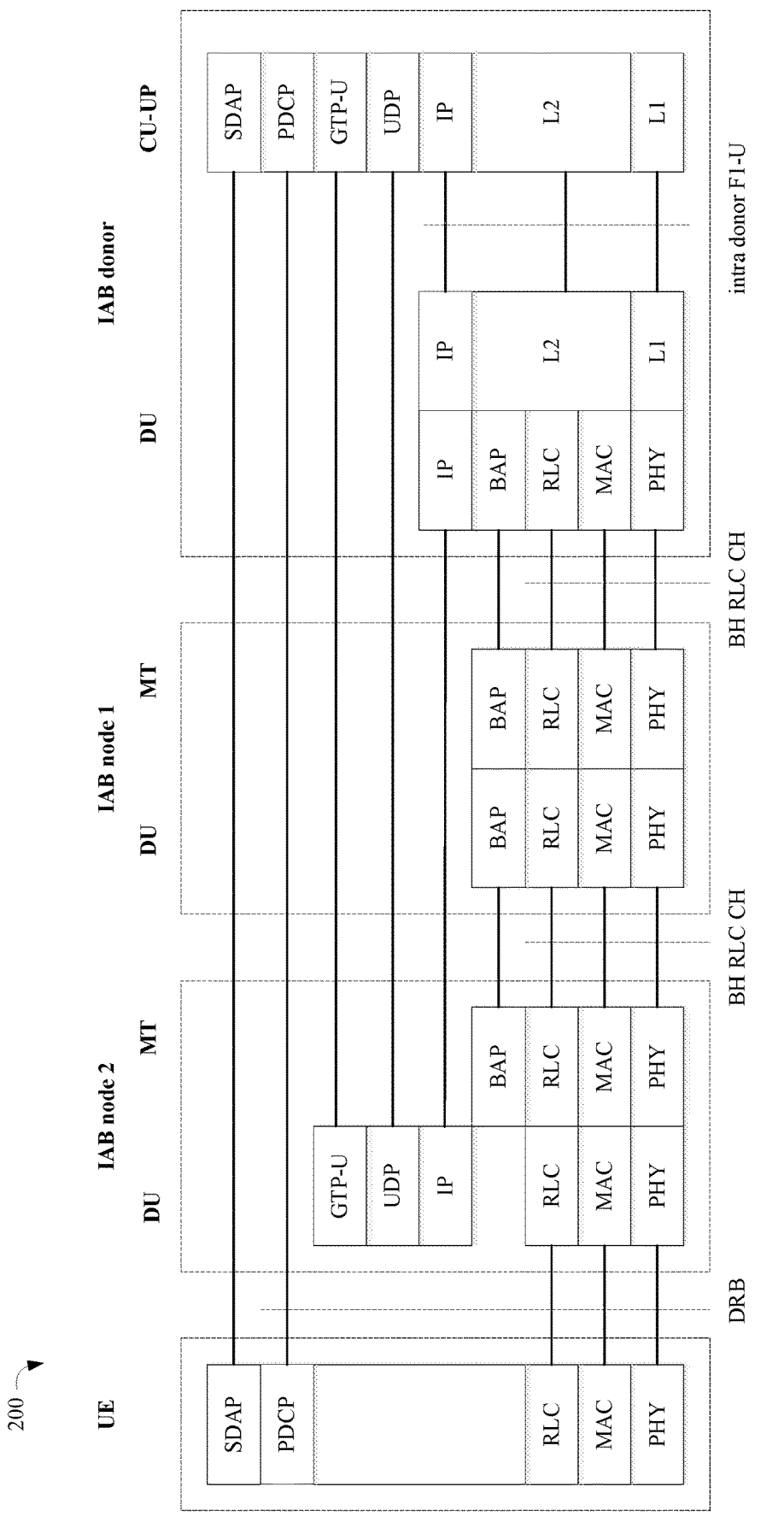
FIG. 2 illustrates an example block diagram of a protocol stack for an IAB network in accordance with some embodiments of the present disclosure.
Figure 3:
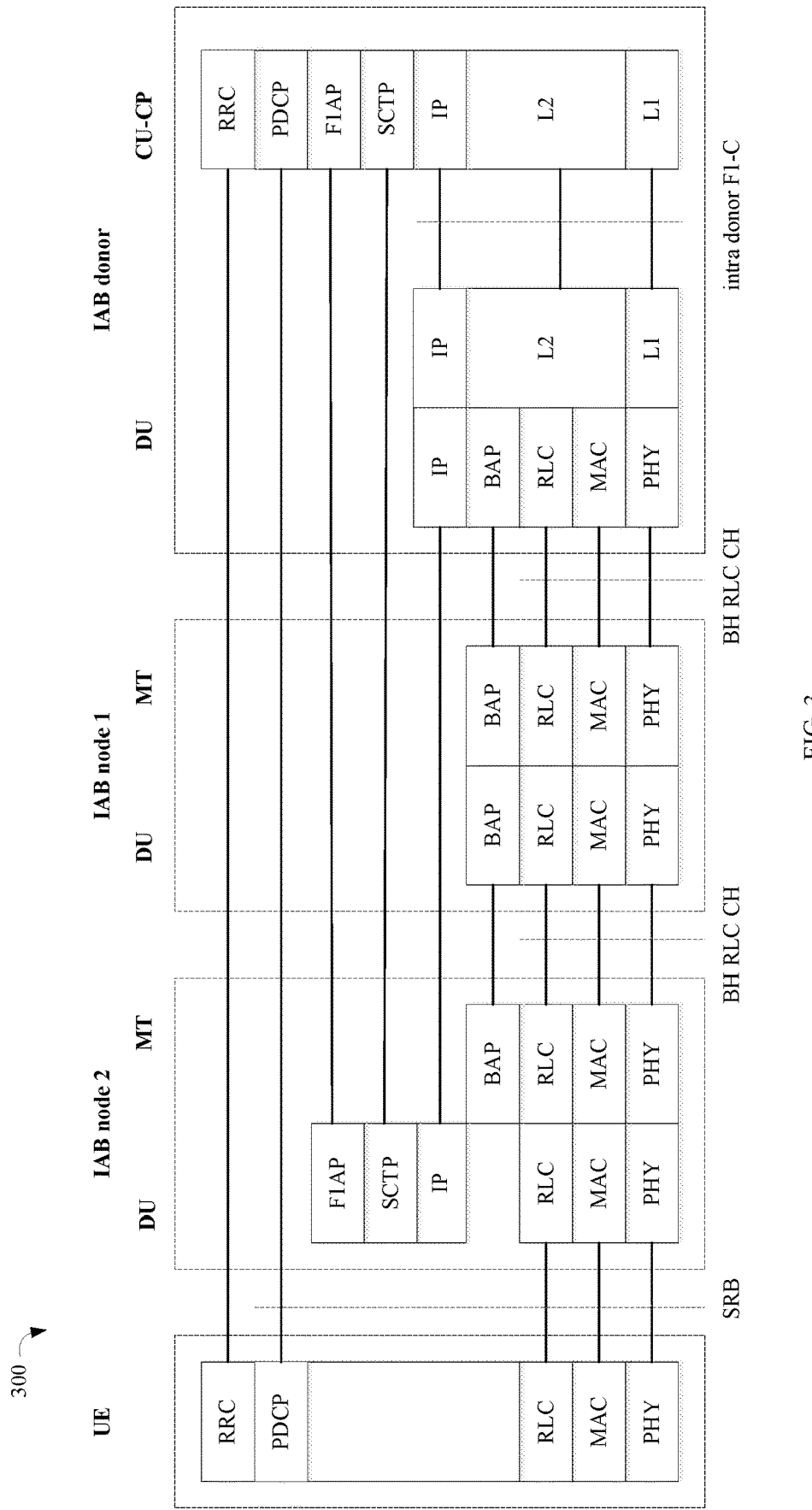
FIG. 3 illustrates an example block diagram of a protocol stack for an IAB network in accordance with some embodiments of the present disclosure.

FIG. 2 illustrates an example block diagram of user plane (UP) protocol stack 200 for an IAB network according to some embodiments of the present disclosure. FIG. 3 illustrates an example block diagram of control plane (CP) protocol stack 300 for an IAB network according to some embodiments of the present disclosure. In FIGS. 2 and 3, a UE may be connected to an IAB donor via IAB node 2 and IAB node 1.

Referring to FIG. 2, the UP protocol stack of the UE may include a service data adaptation protocol (SDAP) layer, a packet data convergence protocol (PDCP) layer, a radio link control (RLC) layer, a medium access control (MAC) layer, and a physical (PHY) layer. The UP protocol stack of the DU of IAB node 2 may include a GTP-U layer, a UDP layer, an IP layer, an RLC layer, a MAC layer, and a PHY layer. The UP protocol stack of the MT of IAB node 2 or the DU or MT of IAB node 1 may include a BAP layer, an RLC layer, a MAC layer, and a PHY layer. The UP protocol stack of the DU of the IAB donor may include an IP layer, a BAP layer, an RLC layer, a MAC layer, and a PHY layer, where the PHY layer belongs to layer 1 (L1), and the BAP layer, the RLC layer, and the MAC layer belong to layer 2 (L2). The protocol stack of the CU-UP of the IAB donor may include a GTP-U layer, a UDP layer, an IP layer, an SDAP layer, a PDCP layer, an L2 layer(s), and an L1 layer.

Referring to FIG. 3, the CP protocol stack of the UE may include a radio resource control (RRC) layer, a PDCP layer, an RLC layer, a MAC layer, and a physical (PHY) layer. The CP protocol stack of the DU of IAB node 2 may include an F1AP layer, an SCTP layer, an IP layer, an RLC layer, a MAC layer, and a PHY layer. The CP protocol stack of the MT of IAB node 2 or the DU or MT of IAB node 1 may include a BAP layer, an RLC layer, a MAC layer, and a PHY layer. The CP protocol stack of the DU of the IAB donor may include an IP layer, a BAP layer, an RLC layer, a MAC layer, and a PHY layer, where the PHY layer belongs to L1, and the BAP layer, the RLC layer, and the MAC layer belong to L2. The protocol stack of the CU-CP of the IAB donor may include an RRC layer, a PDCP layer, an F1AP layer, an SCTP layer, an IP layer, an L2 layer(s), and an L1 layer.

The protocol stacks shown in FIGS. 2 and 3 are only for illustrative purposes. For example, the sequences of some of the protocol layers in the protocol stacks of FIGS. 2 and 3 may be rearranged for illustrative purposes. For example, although the SDAP and PDCP layers belong to L2, they are shown above the GTP-U layer, the UDP layer and the IP layer in the protocol stack of the CU-UP of the IAB donor in FIG. 2.

As demand for improved cellular coverage and connectivity continues to increase, communications in outdoor and mobility scenarios may face more challenges. In some embodiments of the present disclosure, a mobile wireless network node which acts as a relay between a UE and the 3GPP communication network (e.g., 5G) may be employed to facilitate communications in such scenarios. The mobile wireless network node may provide, for example, an access link to UEs and connected wirelessly (e.g., using NR) through a BS (e.g., donor next-generation radio access network (NG-RAN)) to the core network. In some examples, such mobile wireless network node may also be referred to as a mobile base station relay or mobile relay. The above descriptions with respect to the wireless network node and the IAB node can be applied to the mobile base station relay. That is, a mobile base station relay can be a mobile IAB node.

In some examples, the mobile base station relay may be mounted on a vehicle. The mobile base station relay may serve UEs that are located inside or outside the vehicle, or UEs that enter or leave the vehicle. In the context of the present disclosure, inside or outside of a mobile base station relay may mean inside or outside of a vehicle or other device(s) on which the mobile wireless network node is mounted.

In some examples, the radio link used between a mobile base station relay and the served UEs, as well as between the mobile base station relay and the BS, may be a Uu link (e.g., NR-Uu). In some examples, there may be at least one hop between a UE and a mobile base station relay. In some examples, there may be at least one hop between a mobile base station relay and a BS.

The employment of such mobile wireless network node is advantageous in various aspects and can be applied to various scenarios. For example, in some outdoor environments, the availability of vehicles equipped with mobile base station relays, either following a certain known/predictable itinerary (e.g., buses, trams, etc.), or situated in convenient locations (e.g., outside stadiums, hot-spot areas, or emergency sites), may provide a very opportunistic boost to cellular coverage and capacity when or where needed. Those relays may use, for example, a 5G wireless backhaul toward the macro network, and thus can offer better coverage and connectivity to neighboring UEs. Mobile relays are also very suitable for improving connectivity for users or devices inside a vehicle on which the mobile relay is mounted in different environments, for example, for passengers in buses, cars/taxis, or trains, ad-hoc/professional personnel or equipment. Such mobile wireless network node can also be used for reaching users or devices that would otherwise have no or very poor macro coverage, for example, in the case of first responders dislocated in indoor buildings/areas, using relays placed on their nearby or outside vehicles to get required coverage and connectivity.

The technical benefits of using such mobile wireless network node further include, among others, the ability to get better macro coverage than a nearby UE, for example, exploiting better radio frequency, antenna and power capabilities. In addition, besides the value for network operators and end users, worthy incentives may be found for other parties as well, for example, for vehicle manufacturers, and vehicle and fleet owners or providers, to install and operate relays in their vehicles.

In some scenarios, a wireless network node (e.g., stationery or mobile) can be migrated (or handed over) from one BS (source BS or source IAB donor) to another BS (target BS or target IAB donor), or a wireless network node can be migrated to another parent node under another BS. For example, referring back to FIG. 1, IAB node 120C or IAB node 120B may be migrated from IAB donor 110A to IAB donor 110B.

In some embodiments, only the MT of a wireless network node (e.g., an IAB node) may be migrated to from a source BS (e.g., source IAB donor) to a target BS (e.g., target IAB donor). For example, the MT of an IAB node may be migrated to a different parent node underneath the CU of the target IAB donor. For example, referring to FIG. 1, the MT of IAB node 120C may migrate to IAB node 120A underneath IAB donor 110B. In this scenario, the collocated DU of the IAB node and the DUs of its descendant IAB nodes (if any) may retain the F1 connectivity with the source IAB donor (e.g., CU of the source IAB donor). This migration may be referred to as partial migration or inter-donor partial migration. The IAB node may be referred to as a boundary IAB node. After the partial migration, the F1 traffic of the DU of the IAB node and its descendent nodes is routed via the BAP layer of the topology to which the MT of the IAB node has migrated.

In some embodiments, both the MT and the DU of a wireless network node (e.g., an IAB node) may be migrated to from a source BS (e.g., source IAB donor) to a target BS (e.g., target IAB donor). For example, the MT of an IAB node may be migrated to a different parent node underneath the CU of the target IAB donor, and the collocated DU of this IAB node may also migrate its F1 connectivity to the target IAB donor (e.g., CU of the target IAB donor). This migration may be referred to as full migration or inter-donor full migration. In some examples, the descendent nodes of the IAB node (e.g., child IAB nodes and UEs served by the IAB node) also migrate to the target IAB donor (e.g., CU of the target IAB donor).

Embodiments of the present disclosure provide solutions for handling IP address management during the migration of a wireless network node (e.g., an IAB node). More details on the embodiments of the present disclosure will be illustrated in the following text in combination with the appended drawings.

In some embodiments, a wireless network node (e.g., an IAB node) may obtain an IP address(es) either from a BS (e.g., an IAB donor) (also referred to as "BS-based IP address allocation" or "IAB donor-based IP address allocation") or from the OAM system (also referred to as "OAM-based IP address allocation"). The IP address(es) may be used by the wireless network node for F1 and non-F1 traffic exchange via the backhaul. In some examples, in the case that IPsec tunnel mode is used to protect this F1 and non-F1 traffic, the IP address(es) may refer to outer tunnel addresses.

In the case of BS-based IP address allocation, the IP address(es) may be allocated by the CU or DU of a BS (e.g., an IAB donor). In some embodiments, in both cases, a wireless network node (e.g., an IAB node) may request the IP address(es) via, for example, an RRC message from the CU of the BS. The RRC message may include a separate IP address request for each usage. The usages may include all traffic, F1-U, F1-C, and non-F1. In some examples, the CU of the BS may allocate IP addresses. In some examples, the CU of the BS may initiate a transport network layer (TNL) address allocation procedure to obtain IP addresses from the DU of the BS. The CU of the BS may transmit the IP addresses allocated for each usage to the wireless network node via an RRC message. In the case of BS-allocated IP addresses, the IP address(es) of a wireless network node can be updated using DL RRC signaling.

In the case of OAM-based IP address allocation, a wireless network node (e.g., an IAB node) may inform the BS (e.g., CU of the BS) via a UL RRC message about the IP address(es) the wireless network node received (from the OAM) for each usage (purpose). This procedure may occur before the wireless network node uses the IP address(es) for UL and/or DL traffic.

A wireless network node (e.g., an IAB node) may be allocated one or multiple IPv6 addresses for each usage, one or multiple IPv6 prefix (e.g., 64 bits) for each usage, one or multiple IPv4 addresses for each usage, or any combination thereof. Each allocated IP address or IPv6 prefix is unique within an IAB network and routable from a wireline network. In the context of the present disclosure, an IP address may refer to an IPv6 address, an IPv6 prefix, or an IPv4 address.

In some embodiments, an RRC message (e.g., IABother-information message) may be used by a wireless network node (e.g., the MT of the wireless network node) to request the network to allocate IP addresses for the wireless network node (e.g., DU of the wireless network node) or inform the network about IP addresses allocated to the wireless network node (e.g., DU of the wireless network node) (e.g., by an OAM).

In some embodiments, the network may respond with the IP addresses allocated for a wireless network node using an RRC message (e.g., an RRC reconfiguration message). In some embodiments, the network may update the allocated IP addresses using an RRC message (e.g., an RRC reconfiguration message).

In some embodiments of the present disclosure, for the full migration of a wireless network node (e.g., an IAB node), two DUs (e.g., IAB-DUs) may be introduced for the migrated wireless network node. For example, each of the two IAB-DUs of the wireless network node may maintain respective F1 connectivity to the source BS and target BS, respectively. Embodiments of the present disclosure provide solutions for IP address management (e.g., request, alloca-tion, report and release) of a wireless network node when there are two DUs in the wireless network node.

In some embodiments, the above BS-based IP address allocation and OAM-based IP address allocation may be applied to IP address management for the two DUs. How-ever, further requirements may be necessary considering the introduction of the DU associated with the target BS.

Figure 4:
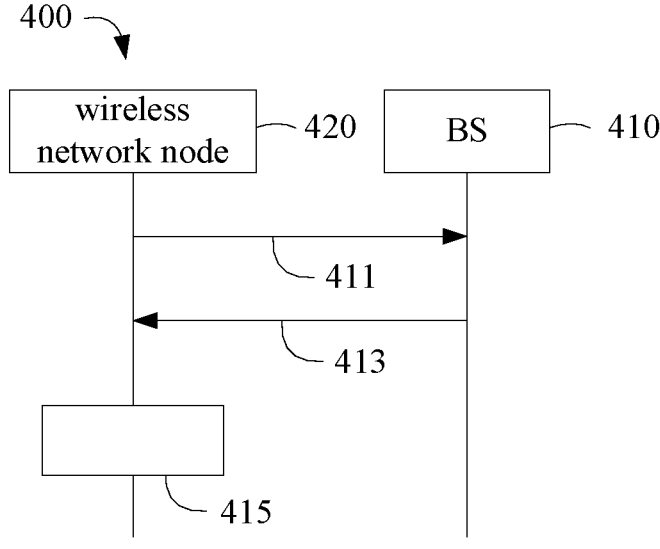

FIG. 4 illustrates a flow chart of exemplary procedure 400 for wireless communications in accordance with some embodiments of the present disclosure. Details described in all of the foregoing embodiments of the present disclosure are applicable for the embodiments shown in FIG. 4.

Referring to FIG. 4, wireless network node 420 may migrate from a source BS to a target BS. Wireless network node 420 may include a DU (DU #A1) associated with the source BS and a DU (DU #A2) associated with the target BS.

In some embodiments, there may be two scenarios for the full migration of a is that the F1 interface setup between the wireless network node (e.g., DU #A2) and the target BS (e.g., CU of the target BS) may occur after the handover of the MT of the wireless network node. Another (denoted as scenario #2) is that the F1 interface setup between the wireless network node (e.g., DU #A2) and the target BS (e.g., CU of the target BS) may precede the handover of the MT of the wireless network node. For different cases, the IP addresses of the DU (e.g., DU #A2) associated with the target BS may be allocated by or reported to different BSs. For example, when the BS-based IP address allocation scheme is applied, the IP addresses of DU #A2 may be allocated by the target BS in scenario #1 and by the source BS in scenario #2. BS 410 in FIG. 4 may be the target BS in scenario #1 and the source BS in scenario #2.

In FIG. 4, it is assumed that the BS-based IP address allocation scheme is applied. In operation 411, wireless network node 420 may transmit an RRC message (e.g., IP address request message) for the IP address of DU #A2 to BS 410 (e.g., CU of BS 410).

In operation 413, BS 410 (e.g., CU of BS 410) may response with the corresponding IP address configuration to wireless network node 420. The IP address configuration may indicate the IP address of DU #A2. In some embodiments, the IP address configuration may include at least one of: one or multiple IPv6 addresses for each usage, one or multiple IPv6 prefix (e.g., 64 bits) for each usage, one or multiple IPv4 addresses for each usage. In some embodi-ments, IP addresses for DU #A1 and DU #A2 may be different.

In some embodiments, an indicator may be added to at least one of the IP address request and the IP address configuration to differentiate the two DUs.

In some examples, an IP address request message for the IP address of DU #A2 may include an indicator to indicate that this request is for DU #A2, and an IP address request message for the IP address of DU #A1 may not include such indicator, which implicitly indicates that this request is for DU #A1. In some examples, the IP address request message may always include an indicator to indicate whether the request message is for DU #A2 or DU #A1. For example, the value of the indicator being "1" may indicate that the IP address request message requests the IP address of DU #A2 and the value of the indicator being "0" may indicate that the IP address request message requests the IP address of DU #A1; or vice versa.

Similarly, in some examples, the IP address configuration for DU #A2 may include an indicator to indicate that this configuration is for DU #A2, and the IP address configura-tion for DU #A1 may not include such indicator, which implicitly indicates that this configuration is for DU #A1. In some examples, the IP address configuration may always include an indicator to indicate whether the configuration is for DU #A2 or DU #A1. For example, the value of the indicator being "1" may indicate that the IP address con-figuration is for DU #A2 and the value of the indicator being "0" may indicate that the IP address configuration is for DU #A1; or vice versa.

In some examples, the IP address request may correspond to an information element (IE) in an RRC message. The RRC message may include two separate IEs for IP address requests for DU #A1 and DU #A2, respectively.

Similarly, in some examples, the IP address configuration may correspond to an IE in an RRC message. The RRC message may include two separate IEs for IP address con-figurations for DU #A1 and DU #A2, respectively.

In operation 415, wireless network node 420 (e.g., DU #A2) may initiate the F1 interface setup procedure to the target BS (e.g., CU of the target BS) using the received IP address of DU #A2.

It should be appreciated by persons skilled in the art that the sequence of the operations in exemplary procedure 400 may be changed and some of the operations in exemplary procedure 400 may be eliminated or modified, without departing from the spirit and scope of the disclosure.

Figure 5:
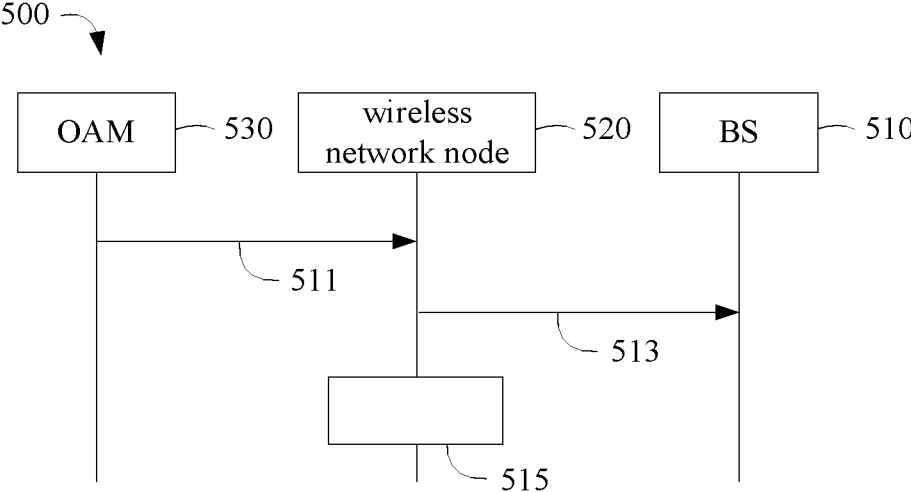

FIG. 5 illustrates a flow chart of exemplary procedure 500 for wireless communications in accordance with some embodiments of the present disclosure. Details described in all of the foregoing embodiments of the present disclosure are applicable for the embodiments shown in FIG. 5.

Referring to FIG. 5, wireless network node 520 may migrate from a source BS to a target BS. Wireless network node 520 may include a DU (DU #B1) associated with the source BS and a DU (DU #B2) associated with the target BS.

In FIG. 5, it is assumed that the OAM-based IP address allocation scheme is applied. As described above, there may be two scenarios for the full migration of a wireless network node (e.g., wireless network node 520). The IP addresses of DU #B2 may be reported to the target BS in scenario #1 and to the source BS in scenario #2. BS 510 in FIG. 5 may be the target BS in scenario #1 and the source BS in scenario #2.

Referring to FIG. 5, in operation 511, wireless network node 520 may obtain the IP address of DU #B2 from OAM 530. In operation 513, wireless network node 520 may transmit the IP address of DU #B2 to BS 510 (e.g., CU of the BS). The IP address may include the IP address for each usage (purpose).

For example, in the case of OAM-based IP address allocation, wireless network node 520 may transmit an IP address report to report its IP address to the target BS or source BS. In some embodiments, an indicator may be added to the IP address report to differentiate DU #B1 and DU #B2.

In some examples, an IP address report for the IP address of DU #B2 may include an indicator to indicate that the report is for DU #B2, and an IP address report for the IP address of DU #B1 may not include such indicator, which implicitly indicates that this report is for DU #B1. In some examples, the IP address report may always include an indicator to indicate whether the report is for DU #B2 or DU #B1. For example, the value of the indicator being "1" may indicate that the IP address report is for DU #B2 and the value of the indicator being "0" may indicate that the IP address report is for DU #B1; or vice versa.

In operation 515, wireless network node 520 (e.g., DU #B2) may initiate the F1 interface setup procedure to the target BS (e.g., CU of the target BS) using the IP address of DU #B2.

It should be appreciated by persons skilled in the art that the sequence of the operations in exemplary procedure 500 may be changed and some of the operations in exemplary procedure 500 may be eliminated or modified, without departing from the spirit and scope of the disclosure.

In some embodiments of the present disclosure, the DU of a wireless network node which is associated with the target BS may (fully or partially) reuse the IP addresses of the DU of the wireless network node which is associated with the source BS.

Figure 6:
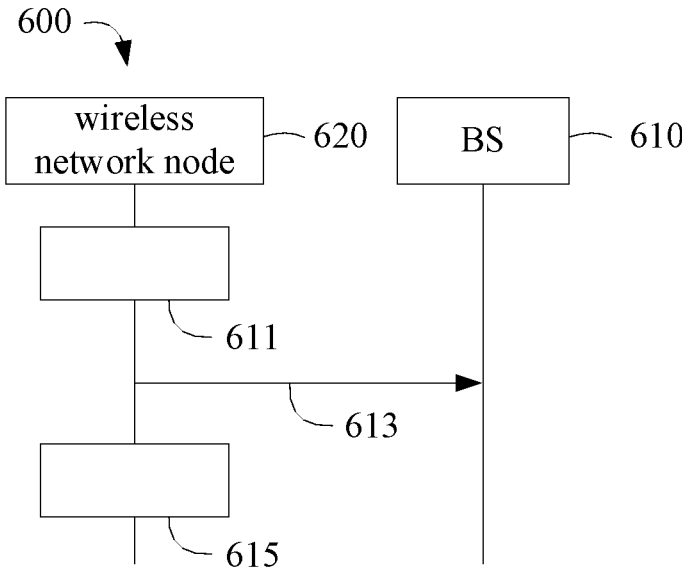

FIG. 6 illustrates a flow chart of exemplary procedure 600 for wireless communications in accordance with some embodiments of the present disclosure. Details described in all of the foregoing embodiments of the present disclosure are applicable for the embodiments shown in FIG. 6.

Referring to FIG. 6, wireless network node 620 may migrate from a source BS to a target BS. Wireless network node 620 may include a DU (DU #C1) associated with the source BS and a DU (DU #C2) associated with the target BS.

Referring to FIG. 6, in operation 611, wireless network node 620 may fully reuse or partially reuse the IP addresses of DU #C1 as IP addresses of DU #C2. For example, when a BS or an OAM does not allocate the IP addresses of DU #C2 for wireless network node 620, such reuse may occur. The IP addresses of DU #C1 may be received from a BS (e.g., one of the source BS and the target BS) or from an OAM, depending on, for example, the IP address allocation scheme employed.

In the full reuse case, the IP address(es) for each usage (purpose) and its usage (purpose) are reused. That is, the IP address configuration for DU #C1 and DU #C2 are exactly the same. In the partial reuse case, DU #C2 may only reuse a part of the IP addresses of DU #C1, and/or DU #C2 may change some usages of some IP addresses.

In operation 613, wireless network node 620 may transmit, to BS 610, information related to the IP address reuse. As described above, there may be two scenarios for the full migration of a wireless network node (e.g., wireless network node 620). BS 610 in FIG. 6 may be the target BS in scenario #1 and the source BS in scenario #2.

In some embodiments, when the IP addresses of DU #C2 fully reuse the IP addresses of DU #C1, wireless network node 620 (e.g., DU #C2) may transmit a full reuse indication to BS 610 in operation 613. That is, wireless network node 620 (e.g., DU #C2) may indicate to BS 610 that full reuse is applied.

In some embodiments, when the IP addresses of DU #C2 partially reuse the IP addresses of DU #C1, wireless network node 620 (e.g., DU #C2) may transmit the IP addresses used by the DU #C2 to BS 610 in operation 613. For example, wireless network node 620 (e.g., DU #C2) may transmit a respective IP address(es) for each usage (purpose) of DU #C2.

In some embodiments, in the case that the OAM-based IP address allocation scheme is applied to DU #C1, wireless network node 620 may further transmit the IP addresses of DU #C1 (e.g., respective IP address(es) for each usage) to BS 610, in addition to the above information related to the IP address reuse.

In operation 615, wireless network node 620 (e.g., DU #C2) may initiate the F1 interface setup procedure to the target BS (e.g., CU of the target BS) using at least one of the IP addresses of DU #C2.

It should be appreciated by persons skilled in the art that the sequence of the operations in exemplary procedure 600 may be changed and some of the operations in exemplary procedure 600 may be eliminated or modified, without departing from the spirit and scope of the disclosure.

To perform the F1 interface setup procedure between a wireless network node (e.g., DU #A2 of wireless network node 420, DU #B2 of wireless network node 520, or DU #C2 of wireless network node 620) and a target BS, the IP address of the target BS (e.g., CU of the BS) may also be provided to the wireless network node. In some embodiments, the IP address of a candidate target BS (e.g., CU of the BS) may be obtained from the OAM. However, for a mobile wireless network node (e.g., mobile IAB node), the IP address of a candidate target BS (e.g., CU of the BS) may be updated in a relatively fast manner along with the high-speed mobility of the wireless network node. Therefore, the OAM based IP address of the candidate target BS may not be applied. Embodiments of the present disclosure further provide solutions to solve this issue.

Figure 7:
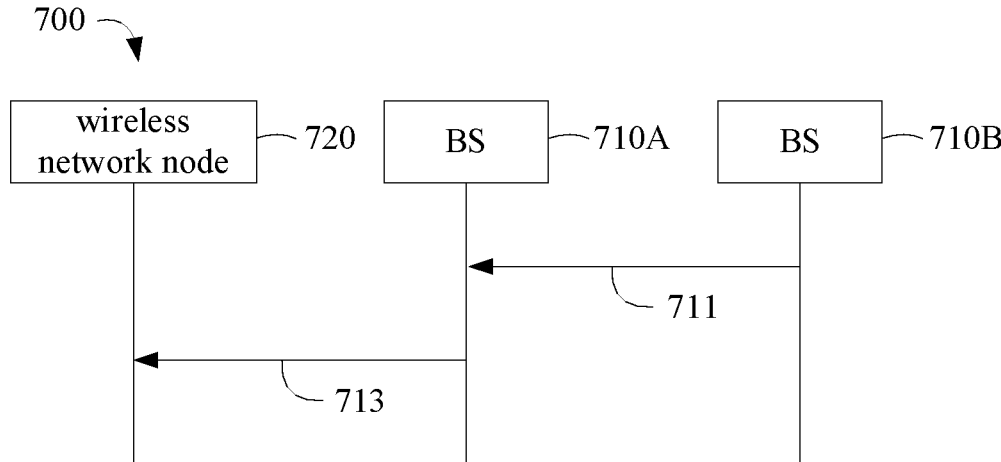

FIG. 7 illustrates a flow chart of exemplary procedure 700 for wireless communications in accordance with some embodiments of the present disclosure. Details described in all of the foregoing embodiments of the present disclosure are applicable for the embodiments shown in FIG. 7.

Referring to FIG. 7, wireless network node 720 may migrate from BS 710A to BS 710B. In some embodiments, wireless network node 720 may be a mobile wireless network node (e.g., mobile IAB node).

In operation 711, BS 710B may transmit its IP address (e.g., IP address of the CU of BS 710B) to BS 710A (e.g., CU of BS 710A) via, for example, an XnAP message. The XnAP message may be a handover request acknowledge message, which may be in response to a handover request message for handing over wireless network node 720.

In operation 713, BS 710A (e.g., CU of BS 710A) may transmit the IP address of BS 710B to wireless network node 720 via, for example, an RRC message or an F1 AP message.

In some embodiments, procedure 700 may occur before operation 415 in FIG. 4, operation 515 in FIG. 5, or operation 615 in FIG. 6. For example, procedure 700 may occur before operation 411, between operations 411 and 413, or after operation 413 but before operation 415.

It should be appreciated by persons skilled in the art that the sequence of the operations in exemplary procedure 700 may be changed and some of the operations in exemplary procedure 700 may be eliminated or modified, without departing from the spirit and scope of the disclosure.

In migration scenario #2, all the IP addresses of the two DUs of a wireless network node may be allocated coupling with the source BS (e.g., DU of the BS). After the handover of the MT of the wireless network node, the F1 interface for the DU associated with the target BS may be redirected from the source path to the target path. The source path refers to the path between the wireless network node and the source BS (e.g., DU of the BS). The target path refers to the path between the wireless network node and the target BS (e.g., DU of the BS). In some cases, the F1 interface for the DU associated with the source BS may also be redirected to the target path. For example, there may be at least one remaining UE served by the wireless network node that needs to be handed over from the source BS) to the target BS after the handover of the MT of wireless network node. In this case, the F1 interface (e.g., F1-C and F1-U connectivity) for the DU associated with the source BS may be redirected to the target path. Therefore, during the full migration, the source BS (e.g., CU of the BS) may request the IP address for the DU associated with the target BS, the DU associated with the source BS, or both via, for example, an XnAP message. For example, the request may be transmitted in an IAB TNL address request of an IAB transport migration management request.

As stated above, the F1 interface for the DU associated with the source BS may be redirected to the target path after the handover of the MT of the wireless network node. After the full migration of the wireless network node, such F1 interface (i.e., F1 interface between the source BS (e.g., CU of the BS) and the DU associated with the source BS) may be removed. In addition, the IP addresses of the DU associated with the source BS may be released by the target BS (e.g., CU of the BS).

Figure 8:
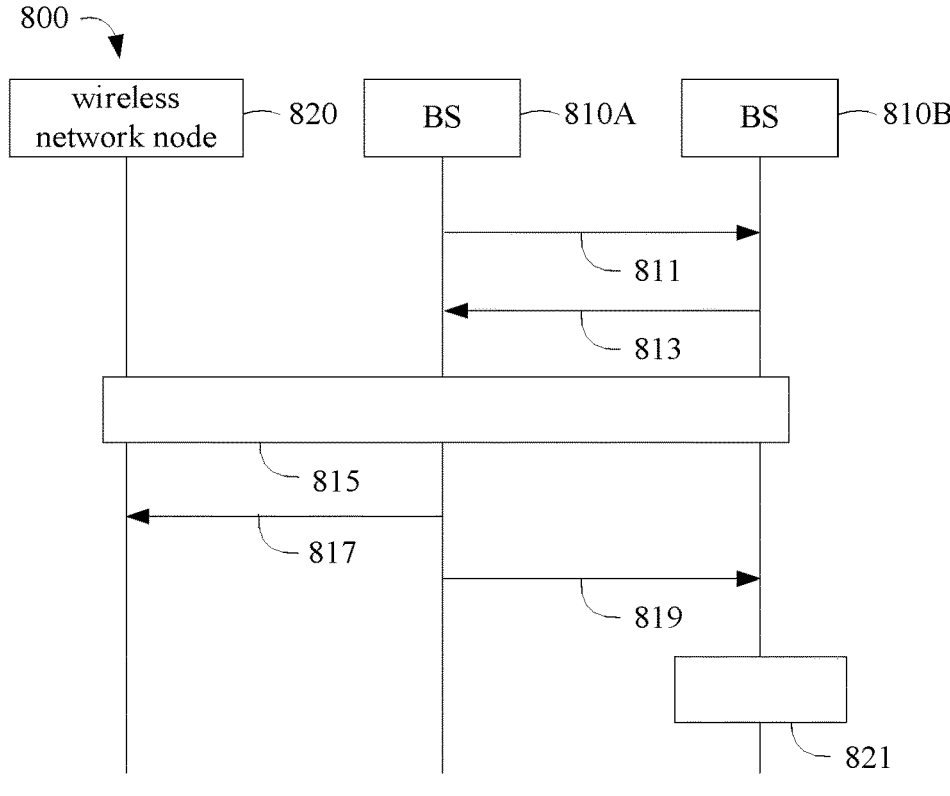

FIG. 8 illustrates a flow chart of exemplary procedure 800 for wireless communications in accordance with some embodiments of the present disclosure. Details described in all of the foregoing embodiments of the present disclosure are applicable for the embodiments shown in FIG. 8.

In FIG. 8, wireless network node 820 may migrate from BS 810A (source BS) to BS 810B (target BS). Wireless network node 820 may include a DU (DU #D1) associated with BS 810A and a DU (DU #D2) associated with BS 810B.

Referring to FIG. 8, in operation 811, BS 810A may transmit a request for IP addresses of wireless network node 820 to BS 810B. The request may be transmitted via a handover request for handing over wireless network node 820 from BS 810A to BS 810B. As a response, BS 810B may transmit the corresponding IP addresses to BS 810A in operation 813.

In some embodiments, the request for IP addresses may request the IP addresses of DU #D1 of wireless network node 820. The IP addresses of DU #D1 is associated with BS 810B (e.g., DU of BS 810B).

In some embodiments, for example, in migration scenario #2, the request for IP addresses may also request the IP addresses of DU #D2. The IP addresses of DU #D2 may include an IP address for an F1 interface between wireless network node 820 and BS 810B.

In operation 815, wireless network node 820 may perform a procedure to migrate its MT from BS 810A to BS 810B.

After the migration of the MT of wireless network node 820, the F1 interface between DU #D1 and BS 810A (e.g., CU of the BS) may be redirected to the source path to the target path using the IP address of DU #D1 obtained in operation 813. The source path refers to the path between wireless network node 820 and BS 810A (e.g., DU of the BS). The target path refers to the path between wireless network node 820 and BS 810B (e.g., DU of the BS). In some examples, such redirection may occur in migration scenario #1 after the migration of the MT of wireless network node 820. In some examples, such redirection may occur in migration scenario #2 after the migration of the MT of wireless network node 820 when there is at least one remaining UE served by wireless network node 820 that needs to be handed over from BS 810A to BS 810B after the MT migration.

In migration scenario #2, after the migration of the MT of wireless network node 820, the F1 interface between DU #D2 and BS 810B (e.g., CU of the BS) may be redirected to the target path using the IP address of DU #D2 obtained in operation 813.

After the full migration of wireless network node 820 or after all the descendant nodes (e.g., wireless network nodes or UEs) of wireless network node 820 have migrated or detached from wireless network node 820, BS 810A may remove the F1 interface between wireless network node 820 (e.g., DU #D1) and BS 810A (e.g., CU of the BS) in operation 817.

In operation 819, BS 810A may transmit an indication to BS 810B to indicate the F1 interface removal in operation 817. In some other embodiment, the indication may be transmitted from wireless network node 820 to BS 810B.

In operation 821, in response to the F1 interface removal indication, BS 810B (e.g., CU of the BS) may release an IP address of DU #D1 of wireless network node 820. For example, BS 810B may perform at least one of the following: (1) release an IP address of DU #D1 in the case that the IP address of DU #D1 is allocated by BS 810B; (2) skip the release of the IP address of DU #D1 in the case that an IP address of DU #D2 fully or partially reuses the IP address of DU #D1; and (3) release the IP address of DU #D1 that is not reused by DU #D2.

It should be appreciated by persons skilled in the art that the sequence of the operations in exemplary procedure 800 may be changed and some of the operations in exemplary procedure 800 may be eliminated or modified, without departing from the spirit and scope of the disclosure.

Figure 9:
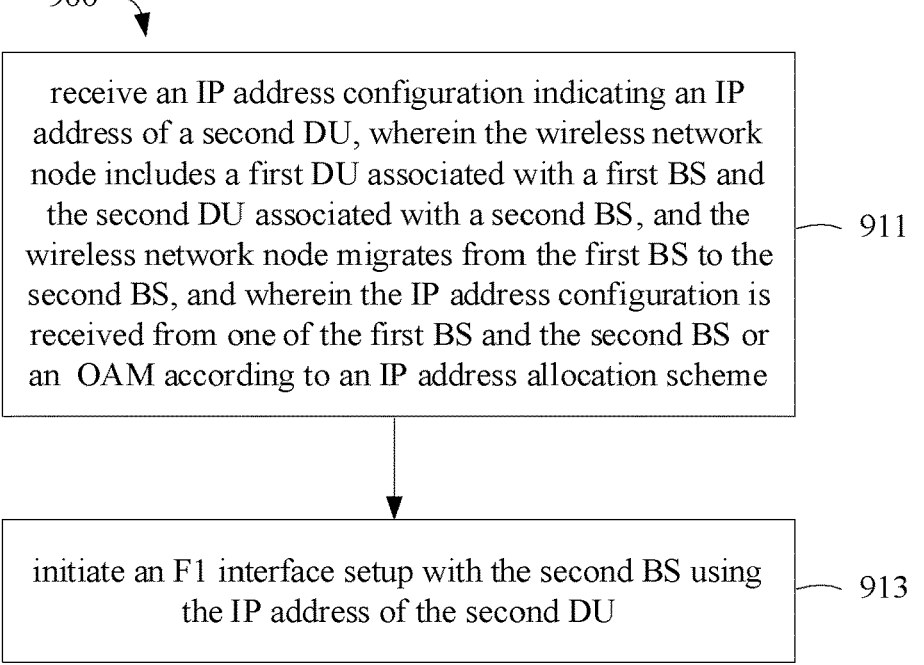

FIG. 9 illustrates a flow chart of exemplary procedure 900 for wireless communications in accordance with some embodiments of the present disclosure. Details described in all of the foregoing embodiments of the present disclosure are applicable for the embodiments shown in FIG. 9.

Referring to FIG. 9, in operation 911, a wireless network node may receive an IP address configuration indicating an IP address of a second DU. The wireless network node includes a first DU associated with a first BS and the second DU associated with a second BS, and the wireless network node migrates from the first BS (source BS) to the second BS (target BS). The IP address configuration is received from one of the first BS and the second BS or an OAM according to an IP address allocation scheme.

In some embodiments, in the case of a BS-based IP address allocation scheme is applied and a MT of the wireless network node has been handed over from the first BS to the second BS, the IP address configuration is received from the second BS. In the case of a BS-based IP address allocation scheme is applied and the MT of the wireless network node has not been handed over from the first BS to the second BS, the IP address configuration is received from the first BS.

In some embodiments, the wireless network node may receive an IP address of the second BS from the first BS.

In some embodiments, in the case that the IP address configuration is received from one of the first BS and the second BS, the wireless network node may transmit an IP address request for the IP address of the second DU to the one of the first BS and the second BS. At least one of the IP address request and the IP address configuration may include an indicator indicating whether the IP address request or the IP address configuration is for the first DU or the second DU.

In some embodiments, in the case that the IP address configuration is received from the OAM, the wireless network node may transmit an IP address report to report the IP address of the second DU to one of the first BS and the second BS. The IP address report may include an indicator indicating whether the IP address report is for the first DU or the second DU. In some embodiments, in the case that a MT of the wireless network node has been handed over from the first BS to the second BS, the one of the first BS and the second BS is the second BS. In some embodiments, in the case that the MT of the wireless network node has not been handed over from the first BS to the second BS, the one of the first BS and the second BS is the first BS.

In operation 913, the wireless network node may initiate an F1 interface setup with the second BS using the IP address of the second DU.

It should be appreciated by persons skilled in the art that the sequence of the operations in exemplary procedure 900 may be changed and some of the operations in exemplary procedure 900 may be eliminated or modified, without departing from the spirit and scope of the disclosure.

FIG. 10 illustrates a flow chart of exemplary procedure 1000 for wireless communications in accordance with some embodiments of the present disclosure. Details described in all of the foregoing embodiments of the present disclosure are applicable for the embodiments shown in FIG. 10.

Referring to FIG. 10, in operation 1011, a wireless network node may fully reuse or partially reuse IP addresses of a first DU as IP addresses of a second DU. The wireless network node includes the first DU associated with a first BS and the second DU associated with a second BS, and the wireless network node migrates from the first BS (source BS) to the second BS (target BS).

In some embodiments, in the case of fully reusing the IP addresses of the first DU, the wireless network node may transmit a full reuse indication to one of the first BS and the second BS. In the case of partially reusing the IP addresses of the first DU, the wireless network node may transmit the IP addresses used by the second DU to one of the first BS and the second BS.

In some embodiments, in the case that a MT of the wireless network node has been handed over from the first BS to the second BS, the one of the first BS and the second BS is the second BS. In the case that the MT of the wireless network node has not been handed over from the first BS to the second BS, the one of the first BS and the second BS is the first BS.

In some embodiments, transmitting the IP addresses used by the second DU may include transmitting a respective IP address for each usage of the second DU.

In some embodiments, the IP addresses of the first DU are received from one of the first BS and the second BS or an OAM according to an IP address allocation scheme.

In operation 1013, the wireless network node may initiate an F1 interface setup with the second BS using at least one of the IP addresses of the second DU.

It should be appreciated by persons skilled in the art that the sequence of the operations in exemplary procedure 1000 may be changed and some of the operations in exemplary procedure 1000 may be eliminated or modified, without departing from the spirit and scope of the disclosure.

FIG. 11 illustrates a flow chart of exemplary procedure 1100 for wireless communications in accordance with some embodiments of the present disclosure. Details described in all of the foregoing embodiments of the present disclosure are applicable for the embodiments shown in FIG. 11.

Referring to FIG. 11, in operation 1111, a first BS may receive, from a second BS, an IP address for an F1 interface between a wireless network node and the second BS. The wireless network node migrates from the first BS (source BS) to the second BS (target BS), and the wireless network node includes a first DU associated with the first BS and a second DU associated with the second BS.

In some embodiments, the first BS may transmit, to the second BS, a request for the IP address for the F1 interface between the wireless network node and the second BS. The request may be included in a handover request.

In some embodiments, in the case that the F1 interface setup between the wireless network node and the second BS precedes the migration of the MT of the wireless network node, the IP address for the F1 interface may include an IP address of the second DU of the wireless network node.

In operation 1113, the first BS may transmit, to the wireless network node, an IP address configuration indicating the IP address for the F1 interface.

In some embodiments, the IP address configuration may include an indicator indicating whether the IP address for the F1 interface is for the first DU or the second DU.

In some embodiments, the first BS may receive an IP address of the second BS from the second BS; and transmit the IP address of the second BS to the wireless network node for the F1 interface between the wireless network node and the second BS.

In operation 1115, the first BS may perform a procedure to migrate an MT of the wireless network node from the first BS to the second BS.

In some embodiments, the first BS may remove an F1 interface between the wireless network node and the first BS in response to a full migration of the wireless network node from the first BS to the second BS. The first BS may transmit, to the second BS, an indication indicating the removal of the F1 interface between the wireless network node and the first BS for the release of an IP address of the first DU of the wireless network node.

It should be appreciated by persons skilled in the art that the sequence of the operations in exemplary procedure 1100 may be changed and some of the operations in exemplary procedure 1100 may be eliminated or modified, without departing from the spirit and scope of the disclosure.

FIG. 12 illustrates a flow chart of exemplary procedure 1200 for wireless communications in accordance with some embodiments of the present disclosure. Details described in all of the foregoing embodiments of the present disclosure are applicable for the embodiments shown in FIG. 12.

Referring to FIG. 12, in operation 1211, a second BS may receive, from a first BS, a request for an IP address for an F1 interface between a wireless network node and the second BS. The wireless network node migrates from the first BS (source BS) to the second BS (target BS), and the wireless network node includes a first DU associated with the first BS and a second DU associated with the second BS.

In operation 1213, the second BS may transmit, to the first BS, the IP address for the F1 interface in response to the request.

In some embodiments, in the case that the F1 interface setup between the wireless network node and the second BS precedes the migration of the MT of the wireless network node, the IP address for the F1 interface may include an IP address of the second DU of the wireless network node.

In some embodiments, the second BS may transmit, to the first BS, an IP address of the second BS for the F1 interface between the wireless network node and the second BS.

In some embodiments, the second BS may receive, from the wireless network node or the first BS, an indication indicating a removal of the F1 interface between the wireless network node and the first BS in response to a full migration of the wireless network node from the first BS to the second BS.

In some embodiments, the second BS may perform one of the following in response to receiving the indication: release an IP address of the first DU of the wireless network node in the case that the IP address of the first DU is allocated by the second BS; skip the release of the IP address of the first DU of the wireless network node in the case that an IP address of the second DU of the wireless network node fully or partially reuses the IP address of the first DU of the wireless network node; and release the IP address of the first DU of the wireless network node that is not reused by the second DU of the wireless network node.

It should be appreciated by persons skilled in the art that the sequence of the operations in exemplary procedure 1200 may be changed and some of the operations in exemplary procedure 1200 may be eliminated or modified, without departing from the spirit and scope of the disclosure.

FIG. 13 illustrates a block diagram of exemplary apparatus 1300 according to some embodiments of the present disclosure.

As shown in FIG. 13, the apparatus 1300 may include at least one processor 1306 and at least one transceiver 1302 coupled to the processor 1306. The apparatus 1300 may be a wireless network node (e.g., an IAB node) or a BS (e.g., an IAB donor, IAB donor-CU, or IAB donor-DU).

Although in this figure, elements such as the at least one transceiver 1302 and processor 1306 are described in the singular, the plural is contemplated unless a limitation to the singular is explicitly stated. In some embodiments of the present application, the transceiver 1302 may be divided into two devices, such as a receiving circuitry and a trans-mitting circuitry. In some embodiments of the present application, the apparatus 1300 may further include an input device, a memory, and/or other components.

In some embodiments of the present application, the apparatus 1300 may be a wireless network node. The transceiver 1302 and the processor 1306 may interact with each other so as to perform the operations with respect to the wireless network node or the IAB node (mobile or station-ary) described in FIGS. 1-12. In some embodiments of the present application, the apparatus 1300 may be a BS. The transceiver 1302 and the processor 1306 may interact with each other so as to perform the operations with respect to the BS, the IAB donor, IAB donor-CU, or IAB donor-DU described in FIGS. 1-12.

In some embodiments of the present application, the apparatus 1300 may further include at least one non-transi-tory computer-readable medium.

For example, in some embodiments of the present dis-closure, the non-transitory computer-readable medium may have stored thereon computer-executable instructions to cause the processor 1306 to implement the method with respect to the wireless network node or the IAB node (mobile or stationary) as described above. For example, the computer-executable instructions, when executed, cause the processor 1306 interacting with transceiver 1302 to perform the operations with respect to the wireless network node or the IAB node (mobile or stationary) described in FIGS. 1-12.

In some embodiments of the present disclosure, the non-transitory computer-readable medium may have stored thereon computer-executable instructions to cause the pro-cessor 1306 to implement the method with respect to the BS, the IAB donor, IAB donor-CU, or IAB donor-DU as described above. For example, the computer-executable instructions, when executed, cause the processor 1306 inter-acting with transceiver 1302 to perform the operations with respect to the BS, the IAB donor, IAB donor-CU, or IAB donor-DU described in FIGS. 1-12.

Those having ordinary skill in the art would understand that the operations or steps of a method described in con-nection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incor-porated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodi-ments. For example, one of ordinary skill in the art of the disclosed embodiments would be enabled to make and use the teachings of the disclosure by simply employing the elements of the independent claims. Accordingly, embodi-ments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "includ-ing." Expressions such as "A and/or B" or "at least one of A and B" may include any and all combinations of words enumerated along with the expression. For instance, the expression "A and/or B" or "at least one of A and B" may include A, B, or both A and B. The wording "the first," "the second" or the like is only used to clearly illustrate the embodiments of the present application, but is not used to limit the substance of the present application.

What is claimed:

1. A wireless network node, comprising:

at least one memory; and at least one processor coupled with the at least one memory and configured to cause the wireless network node to:

receive an internet protocol (IP) address configuration indicating an IP address of a second distributed unit (DU), wherein the wireless network node comprises a first DU associated with a first base station and the second DU associated with a second base station, and the wireless network node migrates from the first base station to the second base station, and wherein the IP address configuration is received from one of the first base station and the second base station or an operation administration and maintenance (OAM) according to an IP address allocation scheme; and initiate an F1 interface setup with the second base station using the IP address of the second DU.

2. The wireless network node of claim 1, wherein in the case of a base station based IP address allocation scheme is applied and a mobile termination (MT) of the wireless network node has been handed over from the first base station to the second base station, the IP address configuration is received from the second base station; or wherein in the case of a base station based IP address allocation scheme is applied and the MT of the wireless network node has not been handed over from the first base station to the second base station, the IP address configuration is received from the first base station.

3. The wireless network node of claim 1, wherein the at least one processor is configured to cause the wireless network node to receive an IP address of the second base station from the first base station.

4. The wireless network node of claim 2, wherein in the case that the IP address configuration is received from one of the first base station and the second base station, the at least one processor is configured to cause the wireless network node to transmit an IP address request for the IP address of the second DU to the one of the first base station and the second base station;

wherein at least one of the IP address request and the IP address configuration includes an indicator indicating whether the IP address request or the IP address configuration is for the first DU or the second DU.

5. The wireless network node of claim 1, wherein in the case that the IP address configuration is received from the OAM, the at least one processor is configured to cause the wireless network node to transmit an IP address report to report the IP address of the second DU to one of the first base station and the second base station; and wherein the IP address report includes an indicator indicating whether the IP address report is for the first DU or the second DU.

6. The wireless network node of claim 5, wherein in the case that a mobile termination (MT) of the wireless network node has been handed over from the first base station to the second base station, the one of the first base station and the second base station is the second base station; or in the case that the MT of the wireless network node has not been handed over from the first base station to the second base station, the one of the first base station and the second base station is the first base station.

7. A wireless network node, comprising:

at least one memory; and at least one processor coupled with the at least one memory and configured to cause the wireless network node to:

fully reuse or partially reuse internet protocol (IP) addresses of a first distributed unit (DU) as IP addresses of a second DU, wherein the wireless network node comprises the first DU associated with a first base station and the second DU associated with a second base station, and the wireless network node migrates from the first base station to the second base station, and initiate an F1 interface setup with the second base station using at least one of the IP addresses of the second DU.

8. The wireless network node of claim 7, wherein in the case of fully reusing the IP addresses of the first DU, the at least one processor is configured to cause the wireless network node to transmit a full reuse indication to one of the first base station and the second base station; or wherein in the case of partially reusing the IP addresses of the first DU, the at least one processor is configured to cause the wireless network node to transmit the IP addresses used by the second DU to one of the first base station and the second base station.

9. The wireless network node of claim 8, wherein in the case that a mobile termination (MT) of the wireless network node has been handed over from the first base station to the second base station, the one of the first base station and the second base station is the second base station; or in the case that the MT of the wireless network node has not been handed over from the first base station to the second base station, the one of the first base station and the second base station is the first base station.

10. The wireless network node of claim 8, wherein transmitting the IP addresses used by the second DU comprises transmitting a respective IP address for each usage of the second DU.

11. A first base station, comprising:

at least one memory; and at least one processor coupled with the at least one memory and configured to cause the first base station to:

receive, from a second base station, an internet protocol (IP) address for an F1 interface between a wireless network node and the second base station, wherein the wireless network node migrates from the first base station to the second base station, and the wireless network node comprises a first distributed unit (DU) associated with the first base station and a second DU associated with the second base station;

transmit, to the wireless network node, an IP address configuration indicating the IP address for the F1 interface; and perform a procedure to migrate a mobile termination (MT) of the wireless network node from the first base station to the second base station.

12. The first base station of claim 11, wherein in the case that an F1 interface setup between the wireless network node and the second base station precedes migration of the MT of the wireless network node, the IP address for the F1 interface includes an IP address of the second DU of the wireless network node.

13. The first base station of claim 11, wherein the IP address configuration comprises an indicator indicating whether the IP address for the F1 interface is for the first DU or the second DU.

14. The first base station of claim 11, wherein the at least one processor is configured to cause the first base station to:

receive an IP address of the second base station from the second base station; and transmit the IP address of the second base station to the wireless network node for the F1 interface between the wireless network node and the second base station.

15. The first base station of claim 11, wherein the at least one processor is configured to cause the first base station to remove an F1 interface between the wireless network node and the first base station in response to a full migration of the wireless network node from the first base station to the second base station, transmit, to the second base station, an indication indicating the removal of the F1 interface between the wireless network node and the first base station for release of an IP address of the first DU of the wireless network node.

16. A method performed by a wireless network node, the method comprising:

receiving an internet protocol (IP) address configuration indicating an IP address of a second distributed unit (DU), wherein the wireless network node comprises a first DU associated with a first base station and the second DU associated with a second base station, and the wireless network node migrates from the first base station to the second base station, and wherein the IP address configuration is received from one of the first base station and the second base station or an operation administration and maintenance (OAM) according to an IP address allocation scheme; and initiating an F1 interface setup with the second base station using the IP address of the second DU.

17. The method of claim 16, wherein in the case of a base station-based IP address allocation scheme is applied and a mobile termination (MT) of the wireless network node has been handed over from the first base station to the second base station, the IP address configuration is received from the second base station; or wherein in the case of a base station-based IP address allocation scheme is applied and the MT of the wireless network node has not been handed over from the first base station to the second base station, the IP address configuration is received from the first base station.

18. The method of claim 16, further comprising receiving an IP address of the second base station from the first base station.

19. The method of claim 17, further comprising, in the case that the IP address configuration is received from one of the first base station and the second base station, transmitting an IP address request for the IP address of the second DU to the one of the first base station and the second base station;

wherein at least one of the IP address request and the IP address configuration includes an indicator indicating whether the IP address request or the IP address configuration is for the first DU or the second DU.

20. The method of claim 16, further comprising, in the case that the IP address configuration is received from the OAM, transmitting an IP address report to report the IP address of the second DU to one of the first base station and the second base station; and wherein the IP address report includes an indicator indicating whether the IP address report is for the first DU or the second DU.

* * * * *